United States Patent [19]

Badovinatz et al.

[11] Patent Number: 5,392,415
[45] Date of Patent: Feb. 21, 1995

[54] SYSTEM FOR GROUPING NON-CONTIGUOUS PAGES BELONGING TO A STORAGE OBJECT FOR PAGE OUT

[75] Inventors: Peter R. Badovinatz, Kingston; Larry Brenner, Stone Ridge; Jeffrey R. Hedglin, Kingston; Barry P. Lubart, Hurley, all of N.Y.; Patrick O'Rourke, Lunenburg, Mass.; Angelo Pruscino, Wappinger Falls, N.Y.

[73] Assignee: International Business Machines Corporation, Armonk, N.Y.

[21] Appl. No.: 991,017

[22] Filed: Dec. 15, 1992

[51] Int. Cl.⁶ .................. G06F 12/06; G06F 12/08; G06F 15/40
[52] U.S. Cl. .................................. 395/425; 395/600
[58] Field of Search .................. 395/425, 250, 600

[56] References Cited

U.S. PATENT DOCUMENTS

| | | | |
|---|---|---|---|
| 4,084,227 | 4/1978 | Bennett et al. | 395/400 |
| 4,432,057 | 2/1984 | Daniell et al. | 395/600 |
| 4,493,034 | 1/1985 | Angelle et al. | 395/700 |
| 4,636,946 | 1/1987 | Hartung et al. | 395/425 |
| 4,660,130 | 4/1987 | Bartley et al. | 395/400 |
| 4,779,191 | 10/1988 | Greenblatt et al. | 395/400 |
| 4,821,185 | 4/1989 | Esposito | 395/250 |
| 4,942,541 | 7/1990 | Hoel et al. | 395/166 X |
| 4,967,353 | 10/1990 | Brenner et al. | 395/425 |
| 5,159,678 | 10/1992 | Wengelski et al. | 395/425 |
| 5,237,673 | 8/1993 | Orbits et al. | 395/425 |
| 5,239,643 | 8/1993 | Blount et al. | 395/425 |
| 5,247,687 | 9/1993 | Eilert et al. | 395/775 |
| 5,269,013 | 12/1993 | Abramson et al. | 395/425 |
| 5,274,813 | 12/1993 | Itoh | 395/700 |
| 5,293,599 | 3/1994 | Kagimasa et al. | 395/425 |

OTHER PUBLICATIONS

"Method of Using Scatter/Gather Indirect List in Micro Channel Computer Systems", IBM Techical Disclosure Bulletin, vol. 33, No. 10B, N.Y., U.S., Mar., 1991, pp. 248-252.

*Primary Examiner*—Jack B. Harvey
*Assistant Examiner*—Michael A. Whitfield
*Attorney, Agent, or Firm*—Willam A. Kinnaman; Andrew J. Dillon

[57] ABSTRACT

A method for assembling swap blocks of virtual pages for transfer between a backing store and physical memory in a data processing system. The method includes segregating all virtual pages resident in physical memory between an active list and an inactive list. Virtual pages are then assigned to the inactive list by groups where each page in a group belongs to a single owning task or object. From a group, virtual pages are assigned to a swap block based upon correlation of most recent use. The swap block may then be paged out in a single operation to a backing store. A list of the group members is kept to permit page in to physical memory upon reference to a member of the swap block.

16 Claims, 6 Drawing Sheets

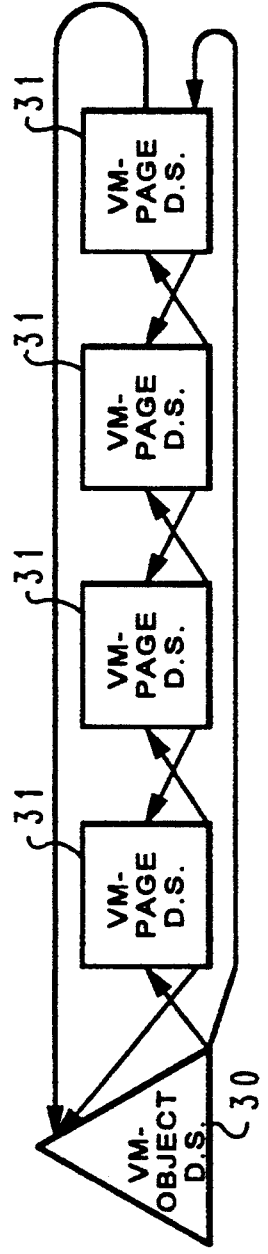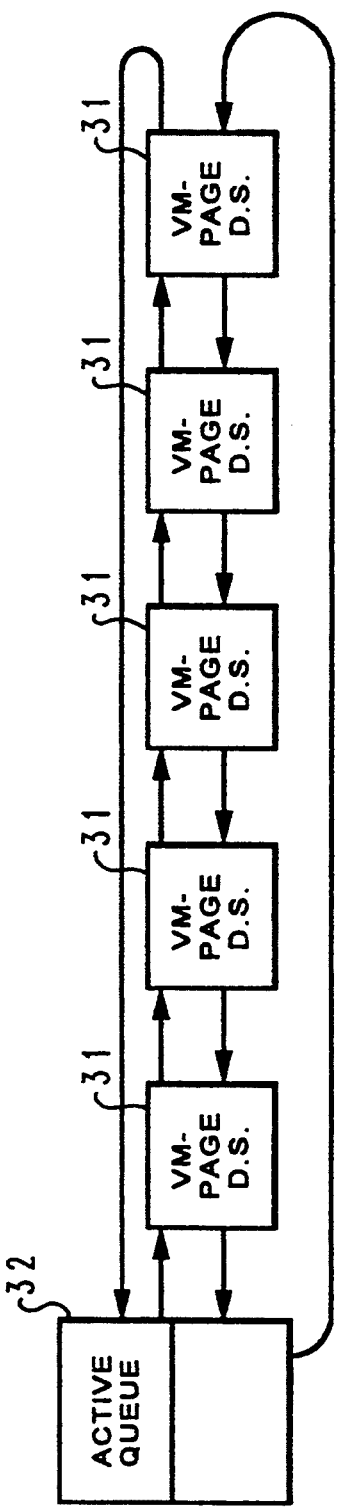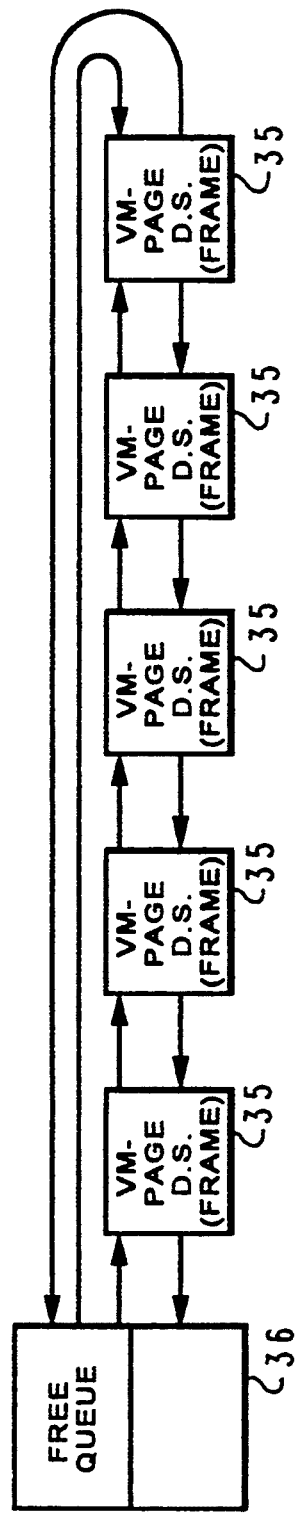

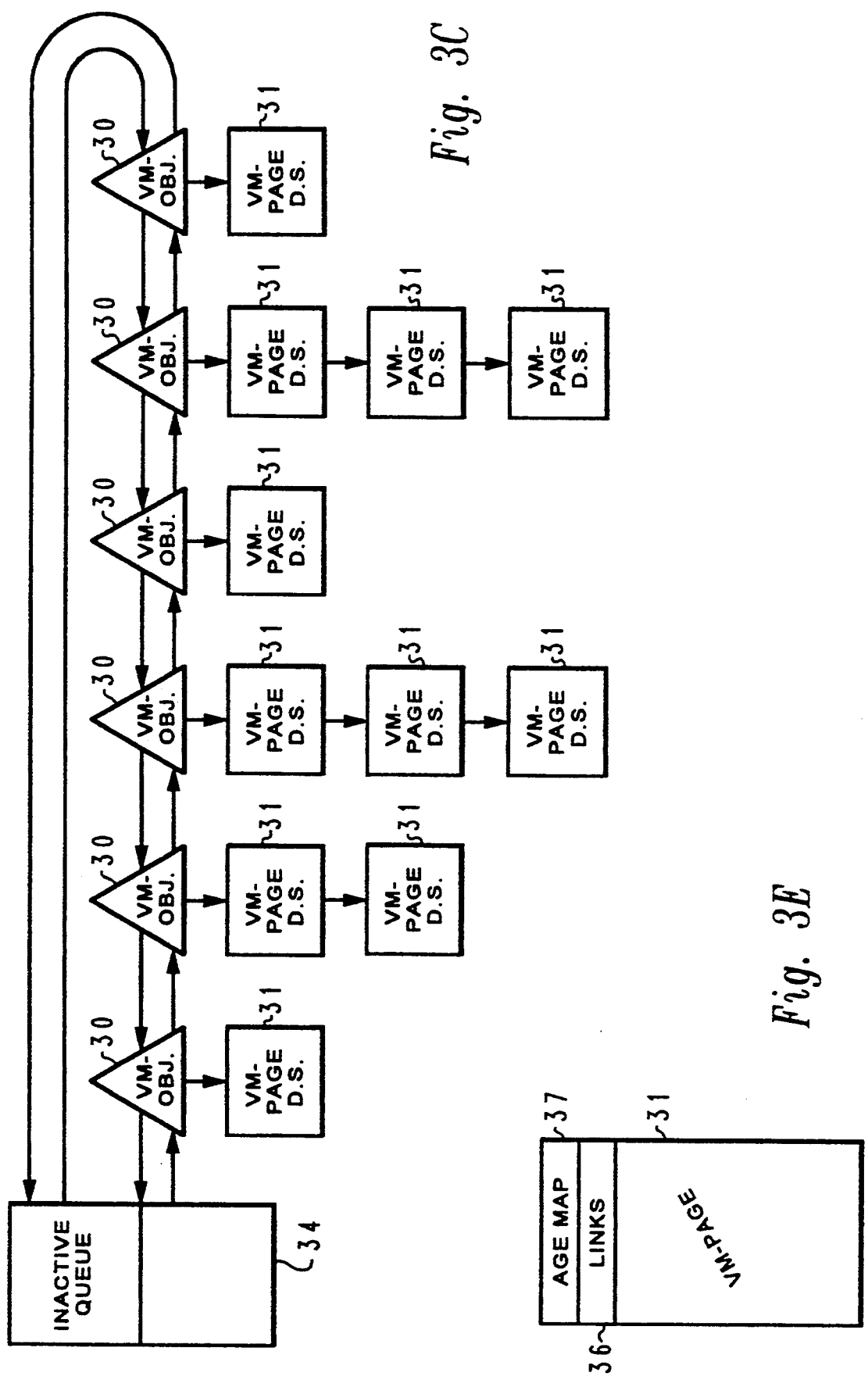

SYSTEM FOR GROUPING NON-CONTIGUOUS PAGES BELONGING TO A STORAGE OBJECT FOR PAGE OUT

BACKGROUND OF THE INVENTION

1. Technical Field

The invention relates to data processing systems utilizing a virtual storage system and more particularly to page replacement based on assembling blocks of pages for movement between storage and physical memory. The invention relates still more particularly to a system for grouping non-contiguous pages into blocks based on memory reference behavior.

2. Description of the Related Art

In most computers, a single central processing unit periodically executes each of a plurality of current processes. This is called multitasking. Before a data to be used by a task can be loaded into the registers of the central processing unit the data must be resident in physical memory. If too many processes are current, insufficient space will exist in physical memory to load all of each process into physical memory. At some point physical memory is simply exhausted.

Virtual storage provides a way of evading the constraints of physical memory size on program size or on the number of programs which may be current. In a system using virtual storage, addresses in a virtual address space are substituted for addresses in physical memory. Because the address space of virtual storage is much larger than the address space of physical memory, programs which cumulatively exceed physical memory in size may be placed in an executable format by the simple expedient of substituting virtual addresses for real addresses. Depending upon the addressing scheme of the computer and its operating system, the address space of virtual storage can extend over all of the auxiliary storage available to a computer, including disk drives and tape drives. The practical implication of this arrangement is that some of the instructions and the data of a process will not be in physical memory when called, even though they may be assigned system addresses and addressed from a process. These instructions must then be moved from auxiliary storage into physical memory. A virtual storage operating system undertakes movement of data between physical memory and auxiliary storage in a manner transparent to the program. Any conflicts for the space are resolved by the operating system by dropping or paging out data to make room for addressed data.

With increases in the number of current processes, the space available in physical memory to each process decreases and the demand for transfers of data to and from auxiliary storage increases. Addressing auxiliary storage is extremely time consuming relative to addressing physical memory, although once undertaken, it is far more efficient to exchange large quantities of data. Thus, implementation of virtual storage can adversely effect system performance. The computer can reach a point where it spends more time moving data back and forth between physical memory and auxiliary storage then performing useful work, a phenomena called thrashing.

Memory management has as an object the efficient support of multiple concurrent processes on a computer using a virtual storage operating system. Efficient implementation of a virtual storage system has two seemingly incompatible objectives. These objectives are efficient utilization of physical memory (met by keeping only the most frequently used data in physical memory to avoid the need to move data) and efficiency in input/output operations (met by moving as much data as possible between physical memory and auxiliary storage with each input/output operation because any time such an operation is undertaken a great deal of time is lost). The objectives are seemingly incompatible because the first objective calls for fine adjustments and the latter objective demands gross adjustments in the contents of physical memory.

The "Locality of Reference" phenomena affords some possibility of reconciling the two objectives. The locality model of computer programs states that, as a program is executed, processing moves from locality to locality within the program. A locality includes those data and instructions which are accessed, perhaps repeatedly, during a period of time. Ideally, instructions and data that are used together are a locality. A relatively clean locality will typically occur with a subroutine. Memory references will typically be made to the lines of code of the subroutine, the local variables of the subroutine and possibly certain global variables. A program typically exhibits several localities, which may overlap. In many operating systems, a function called the scheduler signals to the memory manager which tasks (objects) are to be used, when they are to be used and what pages are expected to be used with those tasks. The scheduling function is called long term scheduling. The long term scheduler is able to identify localities to the memory manager. Memory management is aided by an interface allowing transfer of the long term scheduling information to memory management.

In UNIX operating systems and derivatives thereof (UNIX is a trademark of America Telephone & Telegraph, Inc.) there is no long term scheduling, only short term priority scheduling. No interface is provided for transfer of information identifying a locality to a memory manager. UNIX operating systems work with finer granularity of its address space than other systems further complicating memory management functions. To add such features to the UNIX operating system is possible, but would erode the simplicity of the UNIX operating system and its derivatives which has made the system commercially successful. It is desirable to provide for page out and page in of blocks of virtual pages on a UNIX or UNIX like operating system without reliance on scheduler information.

SUMMARY OF THE INVENTION

It is therefore one object of the invention to provide an improved method for utilizing a virtual storage system and more particularly to page replacement based on assembling blocks of pages closely corresponding to program localities for movement between storage and physical memory.

It is another object of the invention to provide a system for grouping non-contiguous pages into blocks based on memory reference behavior.

The foregoing objects are achieved as is now described. The present invention provides a method for assembling swap blocks of virtual pages for transfer between a backing store and physical memory in a data processing system. The method includes segregating all virtual pages resident in physical memory between an active list and an inactive list. When virtual pages are assigned to the inactive list they are organized by groups where each page in a group belongs to a single owning task or object. From a group, virtual pages are assigned to a swap block based upon correlation of use. The swap block may then be paged out in a single operation to a backing store. A list of the group members is kept to permit page in to physical memory upon reference to a member of the swap block.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A–3E illustrate data structures used to implement the system and method of the present memory manager;

DETAILED DESCRIPTION OF THE INVENTION

Figure 1:
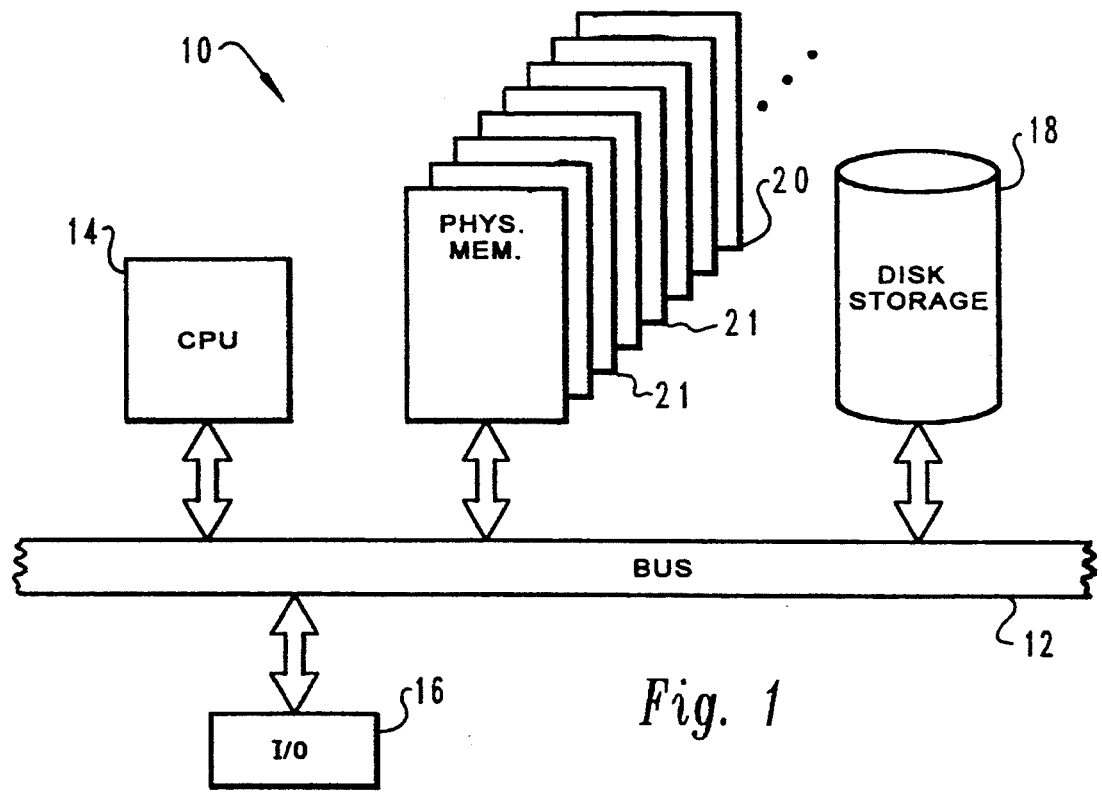
FIG. 1 is a high level block diagram of a digital computer.

FIG. 1 illustrates a high level block diagram of a data processing system suitable for practicing the invention. Data processing system 10 is based on a system bus 12 which carries data between a central processing unit 14, one or more input/output devices 16, and auxiliary storage device such as a disk drive backing store 18 and system physical memory 20. As is known in the art, additional devices such as a direct memory access controller may be provided to control transfer of traffic between data between disk storage 18 and physical memory 20. Generally, data cannot be transferred directly from disk storage 18 to CPU 14 but must be staged to CPU 14 through physical memory 20. Physical memory is divided into frames 21 which typically provide for storage between 512 bytes and 4 kilobytes of data. Frame size sets the size of the basic unit of memory management, the page. Moving a page into or out of a frame is termed paging. A locality evidences itself as groups of pages which exhibit time correlated references during processing.

Figure 2:
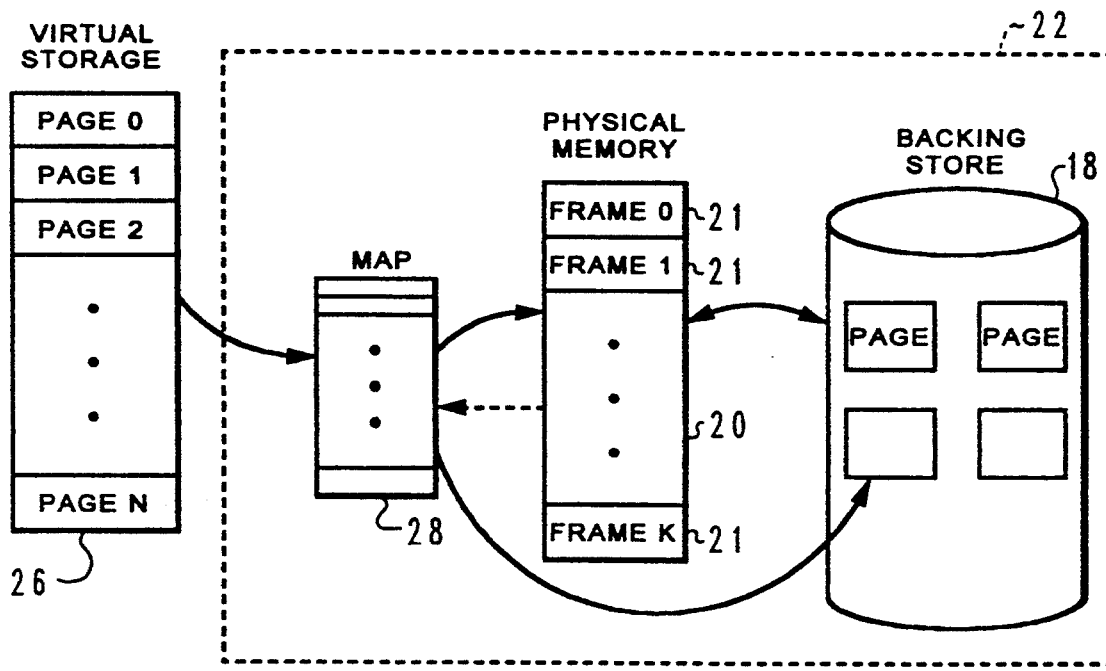
FIG. 2 is a block diagram of the logical organization of a virtual storage system.

FIG. 2 illustrates interrelationships between components of virtual storage system 22. Virtual storage distinguishes logical memory from physical memory 20. For an application executing on CPU 14 virtual storage is organized as the plurality of pages 0 through N which are related to locations in either physical memory 20 or backing store 18 through a map 28. Map 28 is kept in a reserved, predetermined frame of physical memory 20. Map 28 must be constantly updated to reflect movement of pages between backing store 18 and frames of physical memory 20.

FIG. 3A is a block diagram intended to illustrate one data structure used to support the memory management mechanism of the present invention. Each virtual page data structure corresponds to a frame 21 available in physical memory 20. A virtual object data structure 30 is used to group a set of allocated virtual memory page data structures 31 into a virtual memory region. In each region virtual memory page data structures 31 share the same set of access attributes. It is expected that a virtual object data structure 30 corresponds to a particular process or subroutine of a process, or a document opened by a process. Virtual page data structures 31 represent some subset of virtual memory pages storing data owned by the underlying process, subroutine, or data object. A doubly linked list is used to connect the virtual object data structure 30 and its allocated virtual page data structures 31. A virtual object data structure 30 is owned by a task that exists in the system, in other words by a program or data object which is current.

FIG. 3B is a block diagram of an active queue data structure 32 used by the operating system to manage physical memory 20 via the virtual page data structures 31. Active queue 32 is a doubly linked list of allocated virtual page data structures 31 representing virtual memory pages that have recently been accessed by a task. What is meant by recent is subject to adjustment depending upon demand by the several current tasks. FIG. 3C is a block diagram of an inactive queue 34 which is used to connect virtual object data structures 30 that contain allocated virtual page data structures 31 which have not been recently accessed. It is important to remember that these virtual page data structures 31 correspond to frames containing data that remains in physical memory 20. The frames have been designated as available to be paged out upon demand for unallocated virtual page data structures. Paging will not occur until demanded. Frames 21 of physical memory 20 may also be voluntarily released by closing a task or object without intervention of the mechanism of the current invention. Virtual page data structures 31 are attached to a virtual object data structure 30 in a singly linked list ordered in the sequence in which the virtual page data structures 31 became inactive. In other words the first virtual page data structure 31 encountered going down such a singly linked list will be the least recently used of the virtual page data structures 31 in the list. The last virtual page data structure 31 encountered in such a list will be the most recently used. Virtual page data structures 31 from a given list are collected in blocks for efficient paging.

FIG. 3D is a block diagram illustrating a free queue 36 which connects unallocated virtual page data structures 35. Unallocated page data structures 35 correspond to free frames of physical memory 21. Free queue 36 is a doubly linked list maintained in memory 20. When a virtual page data structure is allocated it is removed from the free queue and connected to a virtual object data structure 30 representing a virtual memory region for some task. The virtual page data structure is also linked into active queue 30 as an allocated virtual page data structure 31.

FIG. 3E illustrates a virtual page data structure 31 which includes space for data, locations 39 for links or pointers to other data structures and a bit age map 37 used for allocating the data structure to the active and inactive queues.

Figure 4:
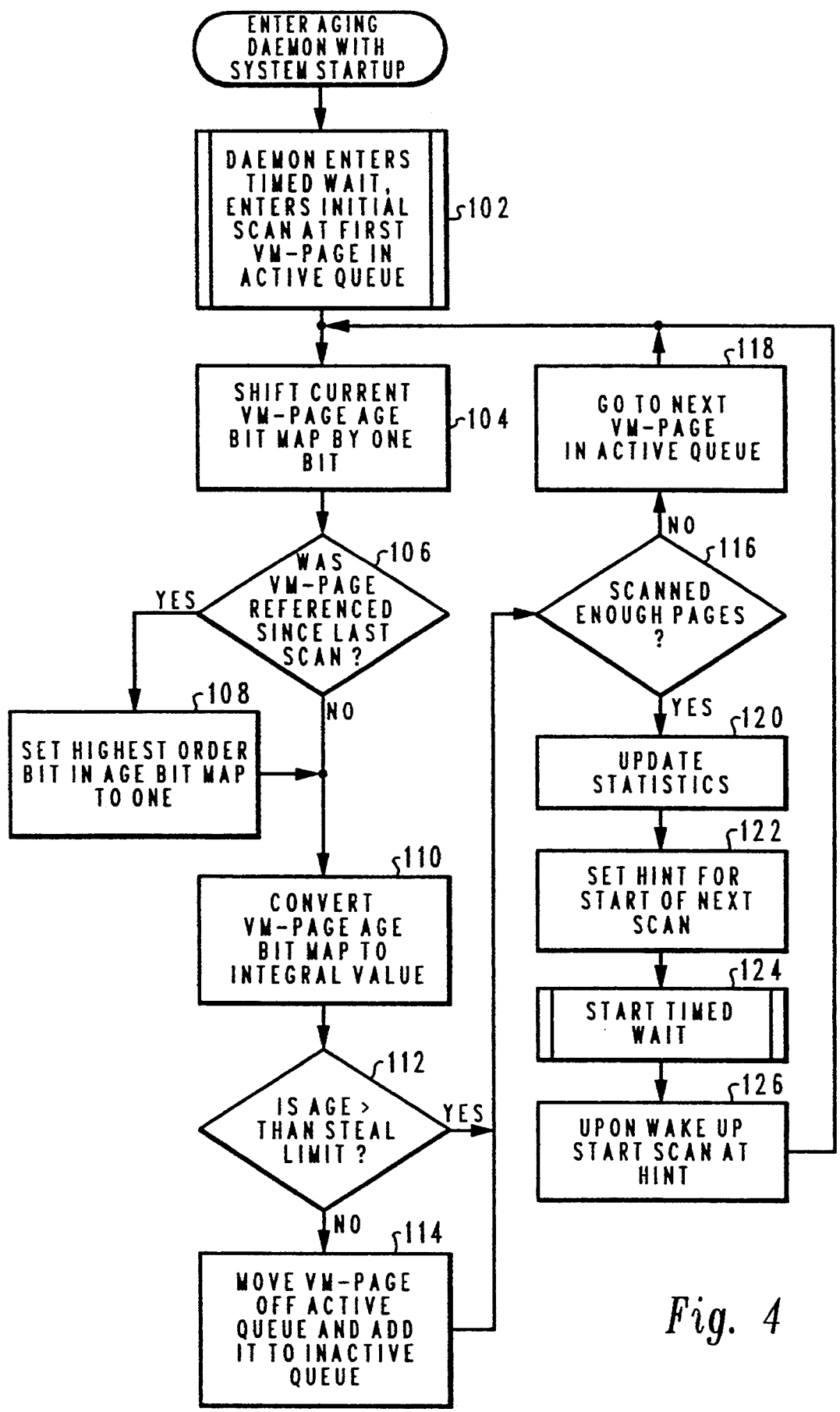
FIG. 4 is a high level logical flow chart of a process implementing the present memory manager.
Figure 5:
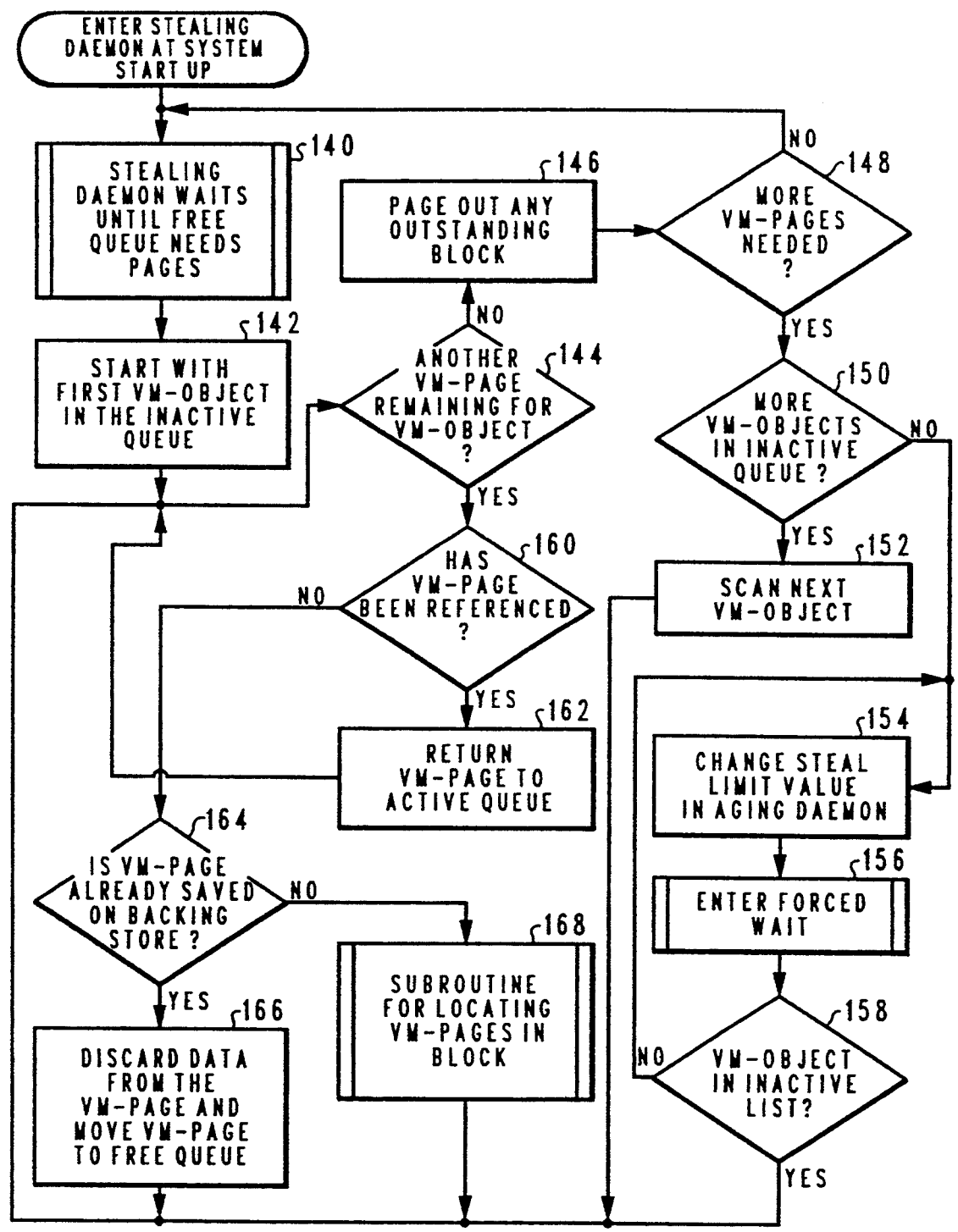
FIG. 5 is a high level logical flow chart of a process implementing the present memory manager.
Figure 6:
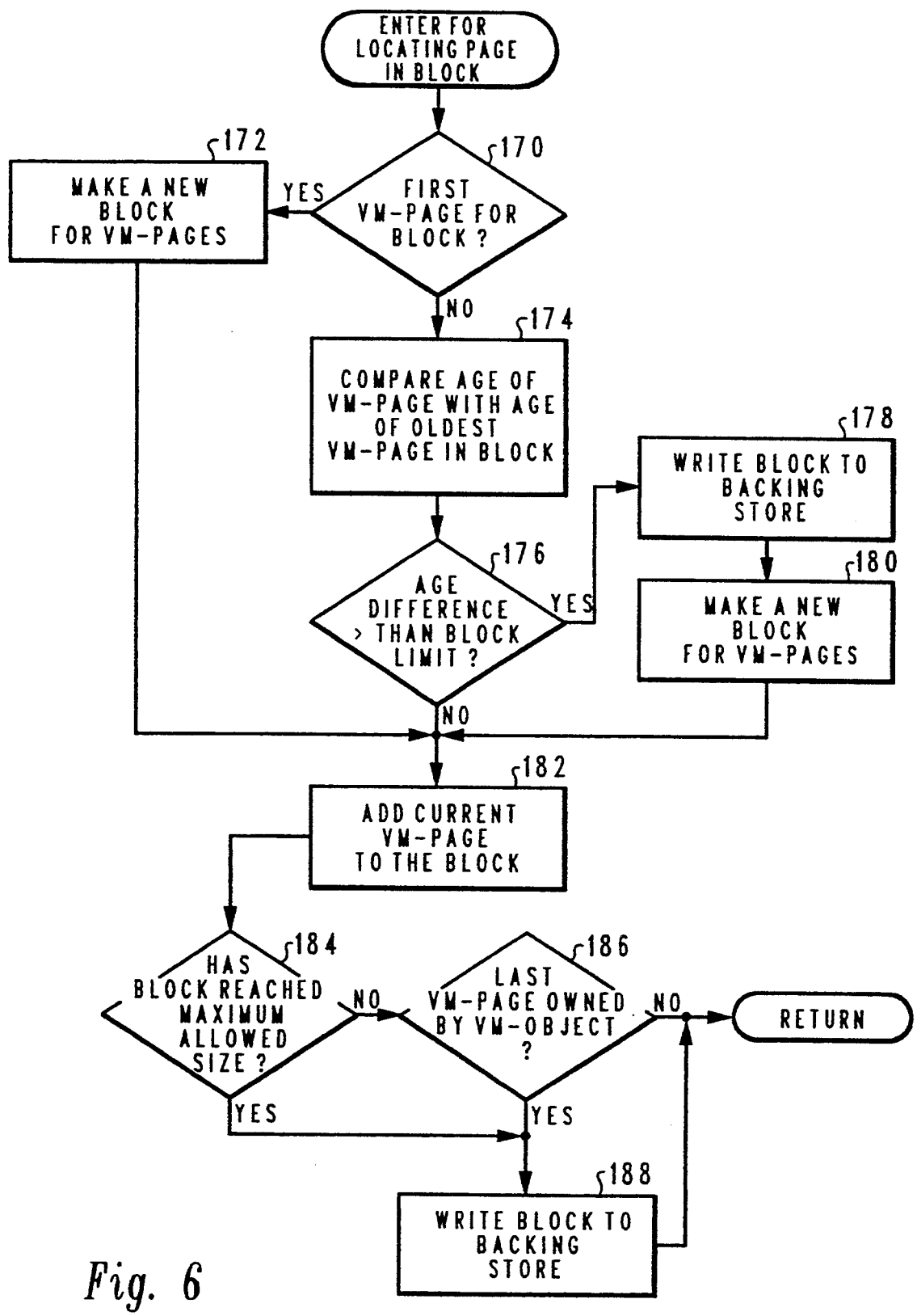
FIG. 6 is a high level logical flow chart of a process implementing the present memory manager.

The method of the present invention is best understood with reference to flow charts of FIGS. 4, 5 and 6. The flow charts illustrate two processes used to manage the virtual memory. Generally, data from virtual memory pages data structures that are no longer being actively referenced is transferred to the backing store and the location in physical memory is reused. One process determines whether a virtual page data structure is being actively referenced through a page aging process which executes in an infinite loop. At system start-up the page aging process begins scans of the active queue, repeatedly inspecting each virtual page data structure. Each virtual page data structure has a reference history. Each time the virtual page data structure is scanned a bit map representing that reference history is shifted by one bit position. If the virtual memory page data structure has been referenced since the last time it was scanned, the most significant or highest order bit of the bit map is set to 1. If the virtual page data structure has not been referenced, the highest order bit is left 0. During each scan, approximately 5% of physical memory of the system is inspected.

The page aging process also provides for moving virtual page data structures to the inactive queue. A steal limit value is maintained for comparison against an age generated from the reference history. As a virtual memory page remains unreferenced, its age will decline with each scan of the page. When the age falls below the steal limit the virtual page data structure is eligible for reuse and is therefore deactivated. At this point a virtual page data structure is moved to the inactive queue. Initially the steal limit value is set at a value equivalent to four scan periods, in other words if the virtual page data structure is unreferenced for four page aging scans, it becomes eligible for release.

The second process provided by the invention is a page stealing process. The page stealing process provides identification of virtual page data structures to localities within programs. As implemented here, non-overlapping portions of localities are identified and those portions are assigned to a group for page out and subsequent page in as a group. Page out and page in are each done in one backing store access operation. The process is executed only upon demand from virtual memory pages, which occurs when the free queue cannot meet system demand.

Referring to FIG. 4, the aging process is entered at system start-up with execution of step 102. In step 102 the aging daemon enters a timed wait, after which an initial scan of the active queue is done. The first scan for all occurrences begins with the first virtual page data structure in the active queue. Next, with execution of step 104 the virtual page data structure being scanned has its age bit map (or reference history) shifted by one bit. In the age bit map a 1 corresponds to a reference of a virtual memory page during a scan period and a 0 corresponds to absence of reference to the virtual memory page during a scan. Next, at step 106 it is determined if the virtual page data structure has been referenced since the last time it was scanned. If YES, step 108 is executed to set the highest order bit in the age bit map to 1. Otherwise the highest order bit is left 0. Along the NO branch from step 106, or after step 108, step 110 is executed to convert virtual memory page age bit map to an integral value (an "age"). This conversion is done as to provide a convenient value for comparison to the steal limit at step 112.

The steal limit is used to divide virtual memory data structures among those being actively referenced and those which are inactive. At step 112 the age is compared to the steal limit. If the age is greater than the steal limit, indicating recent reference to the virtual page data structure, the YES branch is taken to step 116. If the age is not greater than the steal limit, the NO branch is followed to step 114 where the virtual page data structure is removed from the active queue and added to the inactive queue as a dependent of its owning virtual memory object data structure. After step 114 step 116 is executed. At step 116 it is determined if enough virtual memory pages have been inspected to complete a scan. If not, step 118 is executed to go to the next virtual memory page in the active queue and processing is returned to step 104. If the scan is completed, the YES branch is followed from step 116 to steps 120-126, which represent various housekeeping tasks required to conclude the scan.

Step 120 provides for updating of various statistics, such as the number of pages scanned. At step 122, a "hint" for start of the next scan is set. Normally such a hint could be considered to be a pointer to a virtual address. However the task which owns the virtual page data structure indicated by such a pointer may go inactive or close in the intervening period before the scan begins. Closure of a process now requires determination if it owns virtual page data structure indicated by a hint. If it does, the hint must be reset. Step 124 represents start of a waiting period. At step 126, indicating wake-up of the process a scan starts at the next hint. Processing returns to step 104.

A page stealing process is also begun at system start-up. FIG. 5 illustrates the process which is entered at step 140 with a wait for a demand for free pages. It is possible the process will never leave step 140. The process discontinues only with shut down of the system as with the process of FIG. 4. Upon receiving a demand for a free page, step 142 is executed to begin examination of the virtual memory page data structures linked to the first virtual object data structure in the inactive queue. Step 144 provides looping control through a string of virtual page data structures attached to a virtual object data structures in the inactive queue. At step 144 it is determined if another virtual page data structure remains linked to the virtual object data structure. There will always be at least one virtual page data structure attached to a virtual object data structure in the inactive queue. Once all such pages have been examined, the NO branch is followed from step 144 to step 146. Step 146 provides for page out of any outstanding swap block of virtual page data structures for a virtual object data structure. The object data structure is also removed from the inactive queue. Following step 146, step 148 is executed to determine if more virtual page data structures are being demanded over those provided by the page outs already performed. If not, the stealing daemon can return to sleep along the NO branch to step 140. Along the YES branch, indicating more pages are needed step 150 is executed. Step 150 determines if more virtual object data structures remain in the inactive queue.

If more virtual object data structures are available, the YES branch is taken from step 150 to step 152 to provide scanning of virtual page data structures attached to the next virtual memory object. Processing then returns to step 144. If pages are being demanded, but no objects are in the inactive queue, an impasse of sorts has been reached. The NO branch is taken from step 150 to step 154, which provides for a change of the steal limit value in the aging daemon. The steal limit value will be made more aggressive to drive more virtual page data structures into the inactive queue. Next, at step 156, the stealing daemon enters a forced wait covering one or more scan periods. Upon exiting the forced wait, step 158 is executed to determine if any virtual object data structures have been added to the inactive list. If not, the NO branch may be taken back to step 154 to make the steal limit value even more aggressive. If virtual object data structures have been added to the inactive list, virtual page data structures will be available for addition to the free queue and the YES branch may be taken back to step 144 to handle organization of blocks for page outs.

The YES branch from step 144 is taken if unexamined virtual pages remain attached to the current virtual object being scanned. At step 160 it is determined if the current virtual page data structure has been referenced since last examined. If it has it is unavailable for page out. The YES branch is taken to 162 to return the virtual page to the active queue with an updated reference history. If the virtual page has not been referenced the NO branch is followed from step 160 to step 164. At step 164 it is determined if the virtual page is already saved on backing store. If it is, there is no reason to page out the data. However, because of the order of steps in the preferred embodiment, such a virtual page will not be assigned to a group for subsequent page in. Depending upon the application, inclusion of the virtual page in such a group may be desired. If a virtual page is already saved, the YES branch is followed from step 164 to 166 where the frame the virtual page occupies is released and the virtual page data structure is moved to the free queue. Processing then returns to step 144. Following the NO branch from step 164, step 168 is executed to call a subroutine for assembly of virtual memory pages into blocks for page out. The subroutine represented by step 168 also executes those page outs and upon completion of its task returns processing to step 144.

FIG. 6 is a logical flow chart illustrating assignment of virtual pages to swap blocks for page out. The process is entered at step 170 where it is determined if a current block is being assembled for page out. If a page is the first virtual memory page for a block, no block will exist. The YES branch is followed to step 172 where a new block is made to receive the page. If the page was not the first for a block the NO branch is followed from step 170 to step 174. At step 174 a comparison of the age of the virtual page data structure is made with the age of the oldest virtual page data structure in the block. At step 176 it is determined if that age difference is greater than a block limit. If the pages are close enough in age to be considered members of one locality the age difference is less than the block limit. The YES branch from step 176 is followed when the age difference is such to indicate that the pages are not members of one locality. At step 178 the current block is written to a backing store and at step 180 a new block is made to receive the last virtual page data structure analyzed. Subsequent to step 172, 176, or 180, step 182 is executed. At step 182 the current virtual page data structure is added to the current block. Next, at step 184 it is determined if the block has reached its maximum allowed size, which is typically 32 virtual memory pages. If YES, step 188 is executed to write the block to the backing store. If NO, it is determined if the current virtual memory page is the last in the string owned by a virtual memory object. If YES, step 180 is executed to write the block to the backing store. If not, or subsequent to a block write operation, processing is returned to step 144.

While the invention has been particularly shown and described with reference to a preferred embodiment, it will be understood by those skilled in the art that various changes in form and detail may be made therein without departing from the spirit and scope of the invention.

What is claimed is:

1. A method for assembling swap blocks of virtual pages for a virtual storage system of a data processing system including a plurality of virtual pages and a physical memory, the method comprising the steps of:

dividing all virtual pages resident in physical memory among one of an active list and an inactive list;

organizing virtual pages assigned to the inactive list by groups with a single owning process for each group;

within each group, assigning virtual pages to a swap block where most recent use of each virtual page is correlated in time;

paging out a particular swap block in a single output operation to auxiliary storage;

maintaining a membership list for the particular swap block for page in to physical memory upon reference to any virtual page assigned to the particular swap block;

within each group, identifying virtual pages which are duplicated in the auxiliary storage; and releasing space in physical memory occupied by the identified virtual pages without assigning the virtual pages to a swap block.

2. A method as set forth in claim 1, wherein the step of dividing includes, responsive to reference of a virtual page within a selectable period, placing the virtual page in the active list.

3. A method as set forth in claim 2, wherein the step of dividing includes periodically scanning the active list and moving to the inactive list all virtual pages encountered which have not been referenced within the selectable period.

4. A method as set forth in claim 3, and further comprising:

responsive to dynamic demand for physical memory, changing the selectable period.

5. A method as set forth in claim 1, wherein the step of assigning is executed in response to demand for space in physical memory.

6. A method as set forth in claim 5, the method further comprising the steps of:

listing unassigned frames of physical memory on a free list; and adding frames formerly occupied by virtual pages to the free list upon page out of the virtual pages.

7. A method as set forth in claim 1, wherein the inactive list is a doubly linked list of processes and virtual pages are attached to the processes in a singly linked list.

8. A method as set forth in claim 1, and further comprising:

associating each frame of the physical memory with a virtual page data structure;

allocating virtual page data structures to tasks upon demand; and maintaining a reference history for each allocated virtual page data structure.

9. A method as set forth in claim 8, wherein the step of dividing all virtual pages resident in physical memory among one of an active list and an inactive list includes:

upon initial allocation, assigning a virtual page data structure to the active list;

periodically scanning the active list to update the reference history of each virtual page data structure in the active list;

during scanning of a particular virtual page data structure, referring to the reference history for the particular virtual page data structure;

responsive to recent reference, keeping allocated virtual page data structures on the active list; and responsive to lack of recent reference, moving allocated virtual page data structures to the inactive list.

10. A memory manager for a virtual storage system in a computer having a plurality of frames of physical memory and a backing store, wherein the virtual storage system provides a map from virtual pages to frames in physical memory and to locations in the backing store, the memory manager comprising:

means for segregating all virtual pages resident in physical memory between an active list and an inactive list;

means for organizing virtual pages in the inactive list by groups where each virtual page in a group belongs to a single owning task;

means for assigning virtual pages from a group to swap blocks based upon time correlation of most recent use;

means for paging out a particular swap block in a single operation to the backing store;

means for maintaining lists of the membership of each swap block to permit page in of the particular swap block to physical memory upon reference to any member of the particular swap block;

means for identifying a virtual page duplicating data at a location in the backing store; and means for releasing space in physical memory occupied by the identified virtual page without page out of the data.

11. A memory manager as set forth in claim 10, and further comprising:

a virtual page data structure means for associating with each frame of the physical memory;

means for allocating virtual page data structures to virtual pages owned by a task upon demand by the task; and means for storing a reference history for each allocated virtual page data structure.

12. A memory manager as set forth in claim 11, wherein the means for segregating further includes:

means responsive to allocation of a virtual page data structure for assigning the virtual page data structure to the active list;

means for scanning the active list to update the stored reference history of each virtual page data structure in the active list; and means for scanning the stored reference history of a particular virtual page data structure and, responsive to lack of recent reference, moving said particular virtual page data structure to the inactive list.

13. A memory manager as set forth in claim 12, wherein the inactive list is a doubly linked list of processes and virtual pages are attached to the processes in a singly linked list as listed.

14. A memory manager as set forth in claim 10, wherein the means for assigning is responsive to demand for space in physical memory.

15. A memory manager as set forth in claim 14, further comprising:

means for listing unassigned frames of physical memory on a free list; and means for adding frames formerly occupied by virtual pages to the free list upon paging out of the virtual pages from the frames or upon release of the frames.

16. A memory manager as set forth in claim 10, wherein the means for assigning further include:

means for determining a least recently used virtual page for an object and for including the least recently used virtual page in a swap block;

means for determining a time of use difference between the least recently used virtual page and each subsequently used virtual page for the object; and responsive to the time difference for a subsequently used virtual page being less than a predetermined maximum, including the subsequently used virtual page in the swap block.

* * * * *